(12) United States Patent
Park et al.

(10) Patent No.: US 11,611,717 B2
(45) Date of Patent: Mar. 21, 2023

(54) IMAGE SENSING DEVICE AND OPERATING METHOD THEREOF

(71) Applicant: SK hynix Inc., Gyeonggi-do (KR)

(72) Inventors: Yu Jin Park, Gyeonggi-do (KR); Jeong Eun Song, Gyeonggi-do (KR); Kang Bong Seo, Gyeonggi-do (KR); Min Seok Shin, Gyeonggi-do (KR); Jae Hyung Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 177 days.

(21) Appl. No.: 16/985,903

(22) Filed: Aug. 5, 2020

(65) Prior Publication Data

US 2021/0281785 A1    Sep. 9, 2021

(30) Foreign Application Priority Data

Mar. 6, 2020 (KR) .......................... 10-2020-0028217

(51) Int. Cl.
 *H04N 5/363* (2011.01)
 *H04N 5/3745* (2011.01)
 *G06T 7/55* (2017.01)

(52) U.S. Cl.
 CPC ............... *H04N 5/363* (2013.01); *G06T 7/55* (2017.01); *H04N 5/37452* (2013.01); *G06T 2207/10028* (2013.01); *G06T 2207/20224* (2013.01)

(58) Field of Classification Search
 CPC ............................. H04N 5/2176; H04N 5/363
 See application file for complete search history.

(56) References Cited

U.S. PATENT DOCUMENTS

| 6,549,235 | B1 * | 4/2003 | Fossum | H01L 27/14601 |
| | | | | 348/E3.018 |
| 8,089,532 | B2 * | 1/2012 | Mo | H04N 5/374 |
| | | | | 348/241 |
| 2002/0176067 | A1 * | 11/2002 | Charbon | H04N 5/363 |
| | | | | 348/E3.019 |
| 2005/0206548 | A1 * | 9/2005 | Muramatsu | H04N 5/3575 |
| | | | | 341/172 |
| 2006/0061675 | A1 * | 3/2006 | Kim | H04N 5/363 |
| | | | | 348/E5.079 |
| 2009/0190005 | A1 * | 7/2009 | Mo | H04N 5/361 |
| | | | | 348/241 |

(Continued)

FOREIGN PATENT DOCUMENTS

KR    10-2014-0113225    9/2014
KR    10-2014-0147395    12/2014

OTHER PUBLICATIONS

Bamji et al., 1Mpixel 65nm BSI 320MHz Demodulated TOF Image Sensor with 3.5μm Global Shutter Pixels and Analog Binning, ISSCC 2018, Feb. 2018, p. 94-p. 95, IEEE, San Francisco, CA, USA.

(Continued)

*Primary Examiner* — David N Werner
(74) *Attorney, Agent, or Firm* — IP & T Group LLP

(57) ABSTRACT

An image sensing device includes at least one unit pixel including a plurality of pixels for generating a plurality of pixel signals based on a plurality of control signals having different phases, and an equalizing circuit suitable for equalizing noise that occurs in the plurality of pixels during a reset operation on the unit pixel.

13 Claims, 3 Drawing Sheets

(56) References Cited

U.S. PATENT DOCUMENTS

2010/0181465 A1* 7/2010 Fossum ............ H01L 27/14609
250/214 R

OTHER PUBLICATIONS

Seo et al., A 10 ps Time-Resolution CMOS Image Sensor With Two-Tap True-CDS Lock-In Pixels for Fluorescence Lifetime Imaging, IEEE Journal of Solid-State Circuits, Jan. 2016, p. 141-p. 154, vol. 51, IEEE.

Kato et al., 320 × 240 Back-Illuminated 10-μm CAPD Pixels for High-Speed Modulation Time-of-Flight CMOS Image Sensor, IEEE Journal of Solid-State Circuits, Apr. 2018, p. 1071-p. 1078, vol. 53, IEEE.

Keel et al., A 640×480 Indirect Time-of-Flight CMOS Image Sensor with 4-tap 7-μm Global-Shutter Pixel and Fixed-Pattern Phase Noise Self-Compensation Scheme, 2019 Symposium on VLSI Circuits Digest of Technical Papers, Jun. 2019, pp. C258-C259, IEEE, Tokyo, Japan.

* cited by examiner

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0028217, filed on Mar. 6, 2020, the disclosure of which is incorporated herein by reference in its entirety.

BACKGROUND

1. Field

Various embodiments of the present disclosure relate to a semiconductor design technique and, more particularly, to an image sensing device and an operating method thereof.

2. Description of the Related Art

Image sensing devices are devices for capturing images using the property of a semiconductor which reacts to light. Image sensing devices may be classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device capable of removing or offsetting noise that occurs when a depth information signal is generated, and an operating method of the image sensing device.

In accordance with an embodiment, an image sensing device may include at least one unit pixel including a plurality of pixels for generating a plurality of pixel signals based on a plurality of control signals having different phases; and an equalizing circuit suitable for equalizing noise that occurs in the plurality of pixels during a reset operation on the unit pixel.

The reset operation may include an operation of resetting a plurality of charge storage circuits included in each of the plurality of pixels.

The equalizing circuit may be coupled in common to the plurality of pixels.

The image sensing device may further include an image processor suitable for processing the plurality of pixel signals through a subtraction operation.

In accordance with an embodiment, an image sensing device may include a first pixel including a first charge storage circuit for storing first charges during a transmission period, a first sensing circuit for generating the first charges based on a first control signal having a first phase during the transmission period and a first reset circuit for resetting the first charge storage circuit and the first sensing circuit during a reset period; a second pixel including a second charge storage circuit for storing second charges during the transmission period, a second sensing circuit for generating the second charges based on a second control signal having a second phase during the transmission period, and a second reset circuit for resetting the second charge storage circuit and the second sensing circuit during the reset period; and an equalizing circuit coupled in common to a first node between the first reset circuit and the first sensing circuit, and to a second node between the second reset circuit and the second sensing circuit.

The equalizing circuit may electrically couple the first node and the second node to each other during the reset period, and electrically decouple the first node and the second node from each other during the transmission period.

The image sensing device may further include an image processor suitable for performing, during a readout period, a subtraction operation on first and second pixel signals generated respectively from the first and second pixels.

The first pixel may further include a first selection circuit for generating a first pixel signal corresponding to the first charges during a readout period, and the second pixel may further include a second selection circuit for generating a second pixel signal corresponding to the second charges during the readout period.

In accordance with an embodiment, an operating method of an image sensing device may include equalizing noise that occurs due to first and second reset circuits respectively included in first and second pixels based on a reset signal and an equalizing signal; storing first charges generated by a first sensing circuit included in the first pixel in a first charge storage circuit included in the first pixel based on a first control signal having a first phase; storing second charges generated by a second sensing circuit included in the second pixel in a second charge storage circuit included in the second pixel based on a second control signal having a second phase; reading out first and second pixel signals corresponding to the first and second charges stored in the first and second charge storage circuits from the first and second pixels, respectively, based on a selection signal; and generating a depth information signal from which the noise is offset based on the first and second pixel signals.

The generating of the depth information signal may include generating the depth information signal by performing a subtraction operation on the first and second pixel signals.

A deactivation time point of the equalizing signal may be slower than a deactivation time point of the reset signal.

The first and second control signals may have a phase difference of 180 degrees.

In the equalizing the noise, the equalized noise is applied to the first and second charge storage circuits in common.

In accordance with an embodiment, an image sensing device may include first and second pixels for alternately generating first and second pixel signals, the first and second pixels respectively generating first and second noises when reset; an equalizing circuit suitable for equalizing the first and second noise by coupling the first and second pixels to each other during the reset; and an image processor suitable for generating depth information through a subtraction operation on the first and second pixel signals.

These and other features and advantages of the present invention may be better understood from the following description and drawings.

DETAILED DESCRIPTION

Various embodiments of the present invention are described below with reference to the accompanying drawings, in order to describe in detail, the present disclosure so as for those with ordinary skill in art to which the present disclosure pertains to easily carry out the technical spirit of the present disclosure. These embodiments are provided so that this disclosure is thorough and complete, and fully conveys the scope of the present disclosure to those skilled in the art.

It will be understood that when an element is referred to as being "connected to" or "coupled to" another element, it may be directly on, connected to or coupled to the other element, or one or more intervening elements may be present. In addition, it will also be understood that the terms "comprises," "comprising," "includes," and "including" when used in this specification, specify the presence of the stated elements and do not preclude the presence or addition of one or more other elements. In the description of the entire specification, some components are described in singular forms, but the present disclosure is not limited thereto, and it will be understood that the components may be formed in plural.

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

Figure 1:
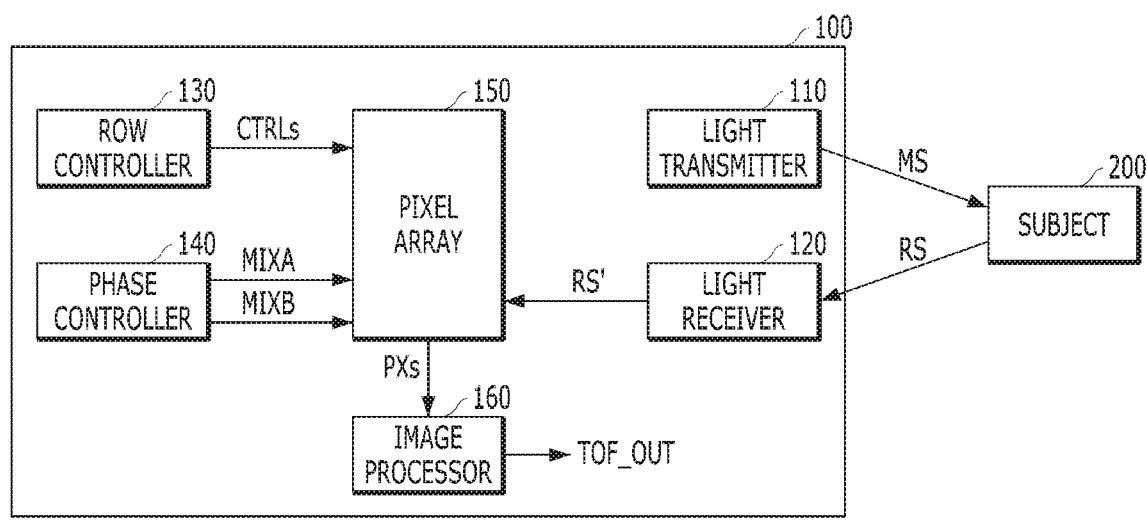
FIG. 1 is a block diagram illustrating an image sensing device in accordance with an embodiment of the present invention.

FIG. 1 is a block diagram illustrating an image sensing device 100 in accordance with an embodiment of the present disclosure.

Referring to FIG. 1, the image sensing device 100 may generate a depth information signal TOF_OUT indicating a depth from a subject 200, based on a time of flight (TOF) scheme. For example, the image sensing device 100 may detect a phase difference between a first light signal MS outputted to the subject 200 and a second light signal RS reflected from the subject 200 to generate the depth information signal TOF_OUT. For example, the image sensing device 100 may include a light transmitter 110, a light receiver 120, a row controller 130, a phase controller 140, a pixel array 150 and an image processor 160.

The light transmitter 110 may output the first light signal MS to the subject 200. For example, the first light signal MS may be a periodic signal that toggles periodically.

The light receiver 120 may receive the second light signal RS reflected from the subject 200. For example, the light receiver 120 may remove noise, caused by ambient light, from the second light signal RS, and provide the pixel array 150 with a third light signal RS' corresponding to the first light signal MS.

The row controller 130 may control the pixel array 150. For example, the row controller 130 may generate a plurality of row control signals CTRLs for each row for controlling the pixel array 150. For example, the row controller 130 may generate first row control signals for controlling pixels arranged in a first row of the pixel array 150, and generate $n^{th}$ row control signals for controlling pixels arranged in an $n^{th}$ row of the pixel array 150, where "n" is a natural number greater than 2.

The phase controller 140 may generate first and second control signals MIXA and MIXB having different phases. For example, the first and second control signals MIXA and MIXB may have a phase difference of 180 degrees. The first and second control signals MIXA and MIXB may have the same period as the first light signal MS. The first and second control signals MIXA and MIXB may have the same phase as the first light signal MS.

The pixel array 150 may generate a plurality of pixel signals PXs based on the third light signal RS', the plurality of row control signals CTRLs and the first and second control signals MIXA and MIXB. The pixel array 150 may include at least one unit pixel for measuring the depth from the subject 200. For example, the unit pixel may be selected based on the plurality of row control signals CTRLs, and generate first and second pixel signals PX1 and PX2 (generally indicated in FIG. 1 with "PXs") based on the first and second control signals MIXA and MIXB and the third light signal RS'. The unit pixel may control the same noise to be reflected in the first and second pixel signals PX1 and PX2 when generating the first and second pixel signals PX1 and PX2. The unit pixel will be described in detail with reference to FIG. 2.

The image processor 160 may generate the depth information signal TOF_OUT indicating the depth from the subject 200, based on the plurality of pixel signals PXs (e.g., the first and second pixel signals). For example, the image processor 160 may perform a subtraction operation on the first and second pixel signals PX1 and PX2 to generate the depth information signal TOF_OUT. Particularly, when the subtraction operation is performed, the same noise reflected in the first and second pixel signals PX1 and PX2 may be offset.

Figure 2:
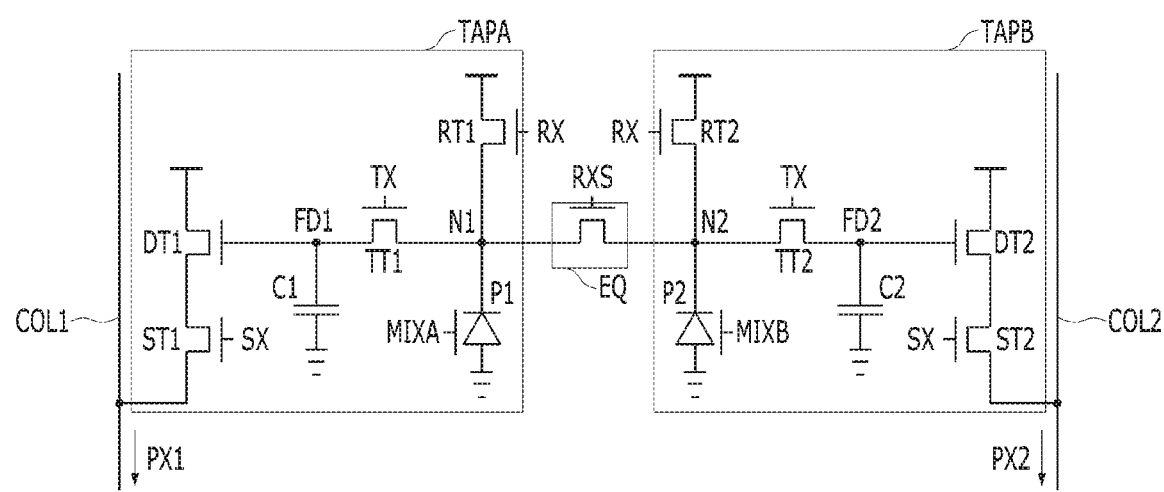
FIG. 2 is a circuit diagram illustrating a unit pixel employed in FIG. 1.

FIG. 2 is a circuit diagram illustrating the unit pixel employed in FIG. 1.

Referring to FIG. 2, the unit pixel may include a first pixel TAPA, a second pixel TAPB and an equalizing circuit EQ operatively coupling the first and second pixels TAPA and TAPB.

The first pixel TAPA may generate the first pixel signal PX1 based on a reset signal RX, a transmission signal TX, a selection signal SX and the first control signal MIXA. The reset signal RX, the transmission signal TX and the selection signal SX are included in the plurality of row control signals CTRLs described above.

In the embodiment of FIG. 2, the first pixel TAPA may include a first sensing circuit P1, a first reset circuit RT1, a first transmission circuit TT1, a first charge storage circuit C1, a first driving circuit DT1 and a first selection circuit ST1. The first sensing circuit P1 may be coupled between a first node N1 and a low voltage terminal. The first sensing circuit P1 may generate first charges corresponding to the third light signal RS', based on the first control signal MIXA. The first sensing circuit P1 may include a photodiode. The first reset circuit RT1 may be coupled between a high voltage terminal and the first node N1. The first reset circuit RT1 may reset the first sensing circuit P1 and the first charge storage circuit C1 based on the reset signal RX. The first transmission circuit TT1 may be coupled between the first node N1 and a first floating diffusion node FD1. The first transmission circuit TT1 may reset the first charge storage circuit C1 based on the transmission signal TX, and transmit the first charges, generated from the first sensing circuit P1, to the first charge storage circuit C1. The first charge storage circuit C1 may be coupled between the first floating diffusion node FD1 and the low voltage terminal. The first charge storage circuit C1 may be a parasitic capacitor. The first driving circuit DT1 may be coupled between the high voltage terminal and the first selection circuit ST1. The first driving circuit DT1 may drive a first column line COL1 with a high voltage supplied through the high voltage terminal, based on a voltage loaded on the first floating diffusion node FD1. The first selection circuit ST1 may be coupled between the first driving circuit DT1 and the first column line COLL. The first selection circuit ST1 may selectively couple the first driving circuit DT1 and the first column line COL1 based on the selection signal SX.

The second pixel TAPB may generate the second pixel signal PX2 based on the reset signal RX, the transmission signal TX, the selection signal SX and the second control signal MIXB.

For example, the second pixel TAPB may include a second sensing circuit P2, a second reset circuit RT2, a second transmission circuit TT2, a second charge storage circuit C2, a second driving circuit DT2 and a second selection circuit ST2. The second sensing circuit P2 may be coupled between a second node N2 and the low voltage terminal. The second sensing circuit P2 may generate second charges corresponding to the third light signal RS', based on the second control signal MIXB. The second sensing circuit P2 may include a photodiode. The second reset circuit RT2 may be coupled between the high voltage terminal and the second node N2. The second reset circuit RT2 may reset the second sensing circuit P2 and the second charge storage circuit C2 based on the reset signal RX. The second transmission circuit TT2 may be coupled between the second node N2 and a second floating diffusion node FD2. The second transmission circuit TT2 may reset the second charge storage circuit C2 based on the transmission signal TX, and transmit the second charges, generated from the second sensing circuit P2, to the second charge storage circuit C2. The second charge storage circuit C2 may be coupled between the second floating diffusion node FD2 and the low voltage terminal. The second charge storage circuit C2 may be a parasitic capacitor. The second driving circuit DT2 may be coupled between the high voltage terminal and the second selection circuit ST2. The second driving circuit DT2 may drive a second column line COL2 with a high voltage supplied through the high voltage terminal, based on a voltage loaded on the second floating diffusion node FD2. The second selection circuit ST2 may be coupled between the second driving circuit DT2 and the second column line COL2. The second selection circuit ST2 may selectively couple the second driving circuit DT2 and the second column line COL2 based on the selection signal SX.

The equalizing circuit EQ may be coupled in common to the first and second pixels TAPA and TAPB. For example, the equalizing circuit EQ may include a MOS transistor positioned between the first node N1 and the second node. The MOS transistor may have a gate end. An equalizing signal RXS may be inputted to the gate end of the MOS transistor. The MOS transistor may also have a source end and a drain end coupled to the first and second nodes N1 and N2. The equalizing circuit EQ may selectively couple the first node N1 and the second node N2 to each other based on the equalizing signal RXS. For example, the equalizing circuit EQ may electrically couple the first node N1 and the second node N2 to each other when the equalizing signal RXS is activated, and electrically decouple the first node N1 and the second N2 from each other when the equalizing signal RXS is deactivated. The equalizing circuit EQ may equalize noise that occurs in the first and second pixels TAPA and TAPB by electrically coupling the first node N1 and the second node N2 to each other. For example, the equalizing circuit EQ may equalize the noise that occurs in the first and second pixels TAPA and TAPB during a reset operation on the unit pixel. The reset operation may be performed during a period when the reset signal RX is activated. The reset operation may be performed during a period when the first reset circuit RT1 included in the first pixel TAPA and the second reset circuit RT2 included in the second pixel TAPB are enabled.

Hereinafter, an operation of the image sensing device 100 having the above-described configuration in accordance with an embodiment of the present invention is described.

Figure 3:
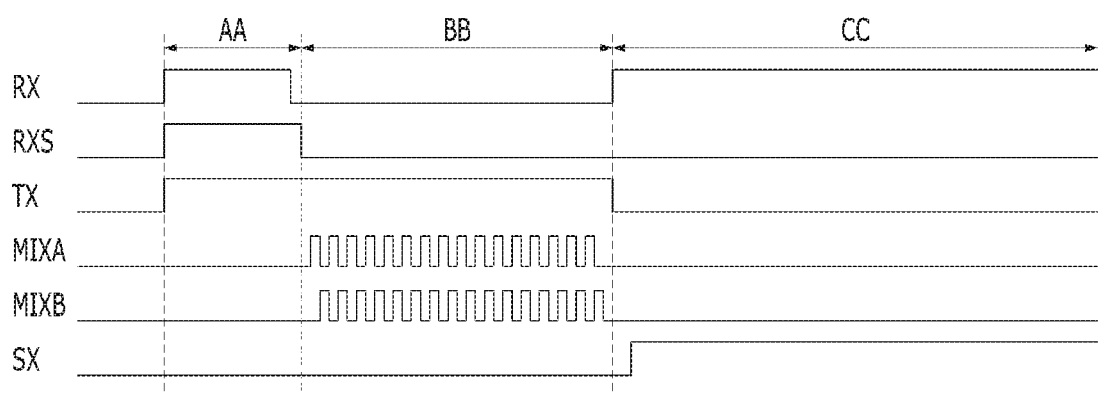
FIG. 3 is a timing diagram illustrating an operation of the image sensing device illustrated in FIG. 1.

FIG. 3 is a timing diagram illustrating the operation of the image sensing device 100 of FIG. 1.

Referring to FIG. 3, the first and second pixels TAPA and TAPB may perform the reset operation during a reset period AA based on the reset signal RX and the transmission signal TX. For example, the first sensing circuit P1 included in the first pixel TAPA may be reset during a period when the reset signal RX is activated, and the first charge storage circuit C1 included in the first pixel TAPA may be reset during a period when the transmission signal TX is activated. Although the present embodiment describes as an example that the reset signal RX and the transmission signal TX are activated at the same time point, the present disclosure is not limited thereto, and the reset signal RX and the transmission signal TX may be activated at different time points depending on design.

The equalizing circuit EQ may equalize noise that occurs due to the first and second reset circuits RT1 and RT2 included in the first and second pixels TAPA and TAPB, respectively, during the reset period AA, based on the reset signal RX and the equalizing signal RXS. At this time, the equalized noise by the equalizing circuit EQ may include noise obtained by equalizing noise occurring when the first reset circuit RT1 is turned off and noise occurring when the second reset circuit RT2 is turned off. The equalized noise may be applied to the first and second charge storage circuits C1 and C2 in common. To this end, a deactivation time point of the equalizing signal RXS may be slower (i.e., later) than a deactivation time point of the reset signal RX. Accordingly, the same reset noise may be applied to the first and second floating diffusion nodes FD1 and FD2 during the reset period AA.

The first pixel TAPA may generate and store the first charges during a transmission period BB based on the transmission signal TX, the first control signal MIXA and the third light signal RS'. For example, the first sensing circuit P1 may generate the first charges based on the first control signal MIXA and the third light signal RS', and the first transmission circuit TT1 may transmit the first charges to the first charge storage circuit C1 based on the transmission signal TX. The second pixel TAPB may generate and store the second charges during the transmission period BB based on transmission signal TX and the second control signal MIXB. For example, the second sensing circuit P2 may generate the second charges based on the second control signal MIXB and the third light signal RS', and the second transmission circuit TT2 may transmit the second charges to the second charge storage circuit C2 based on the transmission signal TX. The first and second control signals MIXA and MIXB may have a phase difference of 180 degrees.

The first pixel TAPA may read out the first pixel signal PX1, corresponding to the first charges, to the image processor 160 during a readout period CC based on the selection signal SX. For example, the first selection circuit ST1 may electrically couple the first driving circuit DT1 to the first column line COL1 based on the selection signal SX, and the first driving circuit DT1 may generate the first pixel signal PX1 by driving the first column line COL1 with the high voltage based on the voltage loaded on the first floating diffusion node FD1. In this case, the first pixel signal PX1 may include the reset noise occurring in the reset period AA. The second pixel TAPB may read out the second pixel signal PX2, corresponding to the second charges, to the image processor 160 during the readout period CC based on the selection signal SX. For example, the second selection circuit ST2 may electrically couple the second driving circuit DT2 to the second column line COL2 based on the selection signal SX, and the second driving circuit DT2 may generate the second pixel signal PX2 by driving the second column line COL2 with the high voltage based on the voltage loaded on the second floating diffusion node FD2. In this case, the second pixel signal PX2 may include the reset noise occurring in the reset period AA.

The image processor 160 may generate the depth information signal TOF_OUT from which the reset noise is offset, based on the first and second pixel signals PX1 and PX2. For example, the image processor 160 may generate the depth information signal TOF_OUT by performing the subtraction operation on the first and second pixel signals PX1 and PX2. Particularly, the image processor 160 may offset the same reset noise, included in the first and second pixel signals PX1 and PX2, by performing the subtraction operation on the first and second pixel signals PX1 and PX2.

According to an embodiment of the present disclosure, the noise occurring in the first and second pixels may be equalized, thereby offsetting the noise when the depth information signal is generated.

According to an embodiment of the present disclosure, as the noise which occurs when the depth information signal is generated is removed or offset, a signal to noise ratio of the depth information signal may be improved. The greater the depth from a subject or the darker the brightness of the subject, the greater the improvement in the signal to noise ratio of the depth information signal.

In addition, since the noise can be removed only by adding a simple circuit into a unit pixel according to an embodiment of the present invention, the area loss of the unit pixel may be minimized.

While the present disclosure of the invention has been illustrated and described with respect to a specific embodiment, the disclosed embodiment is provided for describing the invention only, and is not intended to be restrictive of the scope of the invention. Further, it is noted that the present invention may be achieved in various other ways through substitution, change, and modification that fall within the scope of the invention as defined in the following claims, as those skilled in the art will recognize in light of the present disclosure.

What is claimed is:

1. An image sensing device comprising:
a plurality of unit pixels, wherein each of the unit pixels includes a plurality of pixels and at least one equalizing circuit, for generating a plurality of pixel signals based on a plurality of control signals having different phases,
wherein each of at least two of the plurality of pixels includes a charge storage circuit for storing charges during a transmission period,
a sensing circuit for generating the charges based on a control signal which has a different phase for each of the at least two of the plurality of pixels during the transmission period,
and a reset circuit for resetting the charge storage circuit and the sensing circuit during a reset period, and
wherein the at least one equalizing circuit is coupled in common to a first node between a first reset circuit and a first sensing circuit, and to a second node between a second reset circuit and a second sensing circuit,
and equalizes noise that occurs in the plurality of pixels during a reset operation on the unit pixel.

2. The image sensing device of claim 1, wherein the reset operation includes an operation of resetting a plurality of charge storage circuits included in each of the plurality of pixels.

3. The image sensing device of claim 1, wherein the equalizing circuit is coupled in common to the plurality of pixels.

4. The image sensing device of claim 1, further comprising an image processor suitable for processing the plurality of pixel signals through a subtraction operation.

5. An image sensing device comprising:
a first pixel including a first charge storage circuit for storing first charges during a transmission period, a first sensing circuit for generating the first charges based on a first control signal having a first phase during the transmission period and a first reset circuit for resetting the first charge storage circuit and the first sensing circuit during a reset period;
a second pixel including a second charge storage circuit for storing second charges during the transmission period, a second sensing circuit for generating the second charges based on a second control signal having a second phase during the transmission period, and a second reset circuit for resetting the second charge storage circuit and the second sensing circuit during the reset period; and
an equalizing circuit coupled in common to a first node between the first reset circuit and the first sensing circuit, and to a second node between the second reset circuit and the second sensing circuit.

6. The image sensing device of claim 5, wherein the equalizing circuit electrically couples the first node and the second node to each other during the reset period, and electrically decouples the first node and the second node from each other during the transmission period.

7. The image sensing device of claim 5, further comprising an image processor suitable for performing, during a readout period, a subtraction operation on first and second pixel signals generated respectively from the first and second pixels.

8. The image sensing device of claim 5,
wherein the first pixel further includes a first selection circuit for generating a first pixel signal corresponding to the first charges during a readout period, and
wherein the second pixel further includes a second selection circuit for generating a second pixel signal corresponding to the second charges during the readout period.

9. An operating method of an image sensing device, comprising:
equalizing noise that occurs due to first and second reset circuits respectively included in first and second pixels based on a reset signal and an equalizing signal;
storing first charges generated by a first sensing circuit included in the first pixel in a first charge storage circuit included in the first pixel based on a first control signal having a first phase;
storing second charges generated by a second sensing circuit included in the second pixel in a second charge storage circuit included in the second pixel based on a second control signal having a second phase;

reading out first and second pixel signals corresponding to the first and second charges stored in the first and second charge storage circuits from the first and second pixels, respectively, based on a selection signal; and generating a depth information signal from which the noise is offset based on the first and second pixel signals.

10. The operating method of claim 9, wherein the generating of the depth information signal includes generating the depth information signal by performing a subtraction operation on the first and second pixel signals.

11. The operating method of claim 9, wherein a deactivation time point of the equalizing signal is slower than a deactivation time point of the reset signal.

12. The operating method of claim 9, wherein the first and second control signals have a phase difference of 180 degrees.

13. The operating method of claim 9, wherein, in the equalizing the noise, the equalized noise is applied to the first and second charge storage circuits in common.

* * * * *